(No Model.)

J. FRY.
NUT LOCK.

No. 302,197. Patented July 15, 1884.

WITNESSES
Villette Anderson.
Philip E. Masi.

INVENTOR
John Fry
by Anderson & Smith
his ATTORNEYS

UNITED STATES PATENT OFFICE.

JOHN FRY, OF MOUNT JACKSON, VIRGINIA.

NUT-LOCK.

SPECIFICATION forming part of Letters Patent No. 302,197, dated July 15, 1884.

Application filed October 17, 1882. (No model.)

*To all whom it may concern:*

Be it known that I, JOHN FRY, a citizen of the United States, and a resident of Mount Jackson, in the county of Shenandoah and State of Virginia, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1:
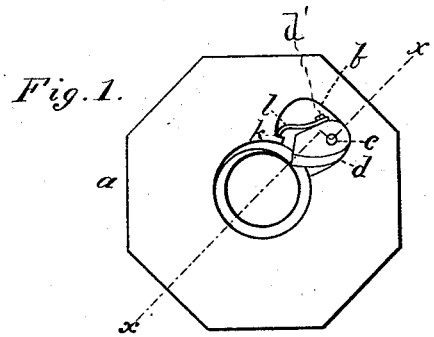
Figure 2:
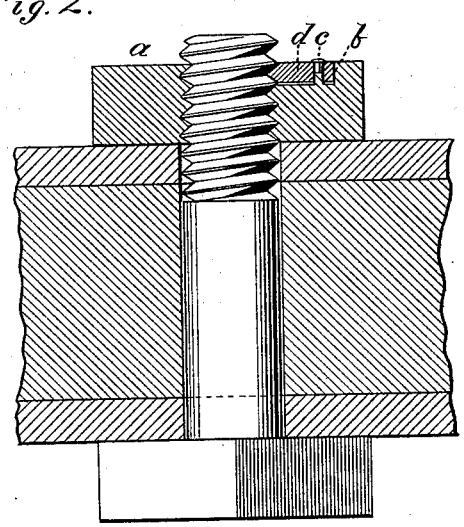
Figure 3:
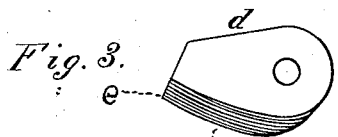
Figure 4:
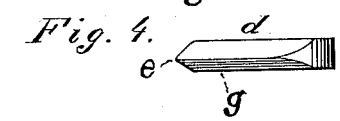

Figure 1 of the drawings is a representation of this invention, and is a plan view. Fig. 2 is a section taken across the line $x\ x$ in Fig. 1. Fig. 3 is a detail showing a plan view of the dog; Fig. 4, a detail showing side view of dog.

This invention has relation to nut-locks; and it consists in the construction and novel arrangement of parts, as will be hereinafter fully described, and particularly pointed out in the claim appended.

In the accompanying drawings, the letter $a$ designates the nut, which is formed with a recess, $b$, in its top, said recess communicating with the threaded bore of the nut. Projecting upward in said recess is a stud or pivot-post, $c$, which, with the recess, is designed to be formed when the nut is stamped.

$d$ represents the dog, which is rounded at its outer end and perforated to engage the post $c$, the latter being headed up to hold the dog in place, but not so tightly that its vibratory motion will be prevented. The rounded end of the dog is designed to fit against the back wall of the recess $b$, which thus forms a support to the pivot-post. The toe $e$ of this dog is oblique and angular, or somewhat pointed, and is beveled on its front edge, $g$, on both sides, as indicated, so that the V-form point will extend into the thread-channel of the bolt. A spring, $l$, is secured to the rear edge of the dog $d$ by a screw, $d'$, and its other end bears against a shoulder, $k$, in the recess $b$. When the nut is turned on the bolt, the dog moves freely with the nut. When, however, there is any tendency to backward movement of the nut, the angular double-beveled point $e$ is pressed into the thread-channel of the bolt, engaging the same forcibly and holding the nut securely in position. In turning off the nut, the dog should be held out of engagement.

Having described this invention, what I claim, and desire to secure by Letters Patent, is—

A nut having a recess, $b$, in its top, communicating with the threaded bore, and a pivot-post in said recess formed integral with the nut, the dog $d$, having an oblique and angular double-beveled toe, $e$, to fit into and engage the thread-channel of the bolt, and the rounded rear end bearing against the wall of the recess to form a support for the pivot-post, and the curved spring $l$, arranged in the recess in rear of and in engagement with the dog, substantially as specified.

In testimony that I claim the above I have hereunto subscribed my name in the presence of two witnesses.

JOHN FRY.

Witnesses:
P. M. S. BIRD,
W. H. FARRA.